United States Patent [19]
Addison

[11] 3,731,339
[45] May 8, 1973

[54] SCRAPER ASSEMBLY FOR PROCESS VESSELS

[75] Inventor: Christopher D. Addison, Media, Del.

[73] Assignee: Sun Oil Company of Pennsylvania, Philadelphia, Pa.

[22] Filed: Sept. 29, 1971

[21] Appl. No.: 184,862

[52] U.S. Cl. .................... 15/246.5, 259/109, 165/94
[51] Int. Cl. ............................................. F28g 3/12
[58] Field of Search ...................... 15/246.5, 104.05, 15/104.09, 104.1, 104.13; 259/182, 104, 103, 109, 110, DIG. 34; 165/109, 94; 23/285

[56] References Cited
UNITED STATES PATENTS

| 3,405,760 | 10/1968 | Smith | 165/94 |
| 2,809,815 | 10/1957 | Born | 259/109 |
| 2,713,474 | 7/1955 | Read | 259/DIG. 34 |

*Primary Examiner*—Leon G. Machlin
*Attorney*—George L. Church et al.

[57] ABSTRACT

A rotating scraper blade, for use in a process vessel containing liquid, is driven by a hollow shaft whose ends are sealed off from the liquid, thereby to entrap air in the hollow interior of the shaft and provide a buoyant effect on the scraper assembly. There may be additional supports for the blade, in the form of pipes whose ends are similarly sealed off from the liquid, and secured to the driving shaft.

4 Claims, 2 Drawing Figures

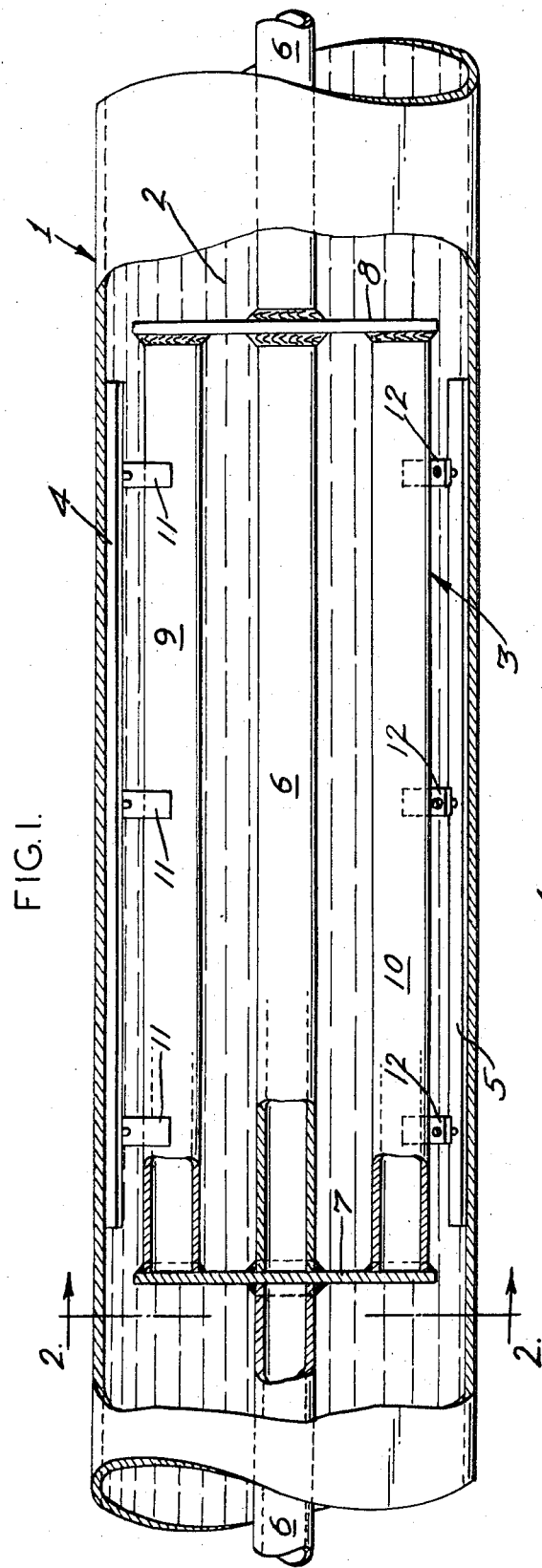
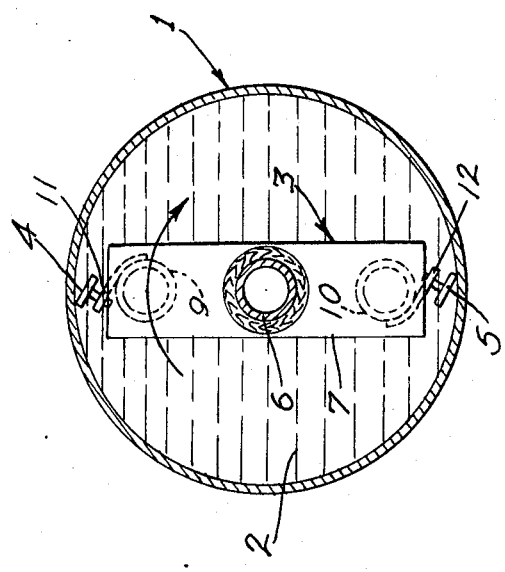

SCRAPER ASSEMBLY FOR PROCESS VESSELS

This invention relates to scraped surface process equipment, and more particularly to a scraper assembly for use in process vessels.

In certain processes, such as heat exchange, mixing, crystallization, precipitation, etc., the process vessel is filled with a liquid (a mother liquor) from which solids settle out. The solids which thus settle out are scraped from the inner wall of the vessel by means of one or more (generally, a pair) of rotating scraper blades which are coupled by means of springs to a central (axial) rotating drive shaft, the cylindrical process vessel being positioned in most cases with its longitudinal axis substantially horizontal. In large diameter vessels, the blades are coupled by means of springs to separate support members which in turn are secured to the central shaft.

The central shaft is mounted in bearings at each end of the vessel, and generally also at intermediate points along its length. The greater the weight of the scraper, the greater the number of intermediate bearings which are required. Ordinarily, spider-supported bearings (wherein the shaft bearings are located at the center or hub of a spoke-like arrangement) are inserted in the vessel to support the scraper at intermediate points along its length. These bearings are difficult to install and provide unscraped surfaces where solids deposit, with resultant obstruction of the flow; this undesirably increases the pressure drop through the vessel. It may be observed that any reduction in scraper weight will lessen the need for such bearings, which is a desirable result. In addition, the weight of the scraper causes bearing wear; here also, any reduction in scraper weight will reduce bearing wear, again a desirable result.

An object of this invention is to provide a novel scraper assembly construction.

Another object is to provide a supporting arrangement for scrapers which reduces the effective weight of the scraper assembly.

A further object is to perform the foregoing objects in a relatively simple yet efficient and effective manner.

A detailed description of the invention follows, taken in conjunction with the accompanying drawing, wherein:

FIG. 1 is a generally longitudinal cross-section of a portion of a process vessel incorporating this invention; and FIG. 2 is a transverse section taken along line 2—2 of FIG. 1.

Referring now to the drawing, a substantially cylindrical process vessel, denoted generally by the numeral 1, is positioned with its longitudinal axis extending horizontally, by way of example. This vessel is elongated, and only a portion of its total length is illustrated in FIG. 1. During operation of the process, vessel 1 contains a liquid 2. Inside vessel 1, there is mounted a scraper assembly, denoted generally by numeral 3. The scraper assembly may for example weigh about 15 pounds per foot of length, and may comprise a plurality of sections one of which is illustrated in FIG. 1.

Scraper assembly 3 comprises a pair of scraper blades 4 and 5 located essentially diametrically opposite each other with respect to vessel 1 and adapted to scrape the inner cylindrical wall of the vessel. For scraping the vessel wall, the blades 4 and 5 are rotated about the longitudinal axis (horizontal in FIG. 1) of vessel 1; by way of example, the direction of rotation of the blades might be clockwise, viewed in FIG. 2. A central hollow shaft 6, mounted axially of vessel 1, is used to support and rotate the blades 4 and 5 about the vessel longitudinal axis. For an elongated vessel 1 as illustrated, the shaft 6 is made up in sections which are welded together end-to-end, with a suitable universal joint between adjacent sections. According to this invention, each section of the hollow shaft 6 is sealingly welded at its opposite ends to respective plates such as 7 and 8, so that the hollow interior of each section of the shaft is sealed off from the liquid 2, thereby to entrap air in the interior of the shaft; at the same time, the plates such as 7 and 8 mechanically couple together adjacent sections of the elongated shaft 6. For example, a universal joint such as previously referred to would be coupled to the section of shaft 6 to the left of plate 7, and another universal joint would be coupled to the section of shaft 6 to the right of plate 8 (FIG. 1). The rigid coupling and sealing plates 7, 8, etc. are spaced, parallel, and extend essentially transversely within vessel 1.

In some cases, the blades 4 and 5 would be mounted on leaf springs connected to the central shaft 6. However, for large diameter equipment such as that illustrated, secondary supports, in the form of tubular (hollow) support members 9 and 10, are utilized. The elongated support members 9 and 10 extend parallel to shaft 6, on respective opposite sides thereof. Viewed in elevation, as in FIG. 2, the plates 7, 8, etc. are substantially rectangular in shape. One end of member 9 is sealingly welded to plate 7, and the opposite end of this member is sealingly welded to plate 8; thus, the hollow interior of member 9 is sealed off from the liquid 2, thereby to entrap air in the interior of this member, and member 9 is mechanically secured to driving shaft 6 through plates 7 and 8. Similarly, one end of member 10 is sealingly welded to plate 7, and the opposite end of this latter member is sealingly welded to plate 8; thus, the hollow interior of member 10 is sealed off from the liquid 2, thereby to entrap air in the interior of this member, and member 10 is mechanically secured to driving shaft 6 through plates 7 and 8.

A plurality of longitudinally-spaced leaf springs 11 are utilized to couple scraper blade 4 to member 9, for support and rotation thereby. One end of each spring 11 is attached to scraper blade 4, and the other end of each spring is attached to member 9 (see FIG. 2).

A plurality of longitudinally-spaced leaf springs 12 are utilized to couple scraper blade 5 to member 10, for support and rotation thereby. One end of each spring 12 is attached to scraper blade 5, and the other end of each spring is attached to member 10.

As the shaft 6 rotates about its own axis (which is collinear with the longitudinal axis of vessel 1), it carries the plates 7, 8, etc. around with it, rotating the members 9 and 10, which (through springs 11 and 12) drive in turn the scraper blades 4 and 5. The blades 4 and 5, as they rotate about the longitudinal axis of vessel 1, scrape the inner wall of this cylindrical vessel.

As previously described, the hollow shaft 6, and also the tubular support members 9 and 10, are sealed off from the liquid 2, so that air is entrapped in the hollow interiors of all of the hollow members (or pipes) 6, 9, and 10. This air entrapped in the members (which are entirely surrounded by the process liquid 2, within vessel 1) provides a buoyant effect (which may be thought of as a flotation effect) on the scraper assembly which reduces its effective weight, due to the weight of the liquid 2 (process fluid) displaced. An effective weight reduction of 25 percent can easily be obtained, depending upon the process liquid. This reduction in the effective weight of the scraper assembly reduces bearing wear, and also reduces the need for internal bearings (i.e., bearings located at intermediate points along the length of the scraper assembly).

It has been stated that the improved scraper assembly of this invention reduces the need for internal bearings (spider bearings). Whether such spider bearings can be completely eliminated will depend on the length of the scraped vessel, the density of the liquid 2, and the design of the springs 11 and 12. For very long scrapers, some spider bearings will probably still be required, since the flotation effect or buoyant effect (resulting from the use of this invention) does not equal 100 percent of the weight of the scraper assembly.

The foregoing description has assumed that the shaft 6 is made up in sections which are welded together. This is a common type of construction, and it enables plates 7, 8 to seal off all three hollow members 6, 9, and 10. If this type of construction is not used, seal-welded plugs can easily be inserted in the hollow members, to seal them off from the liquid 2.

In petroleum processing, processes in which the scraped surface equipment of this invention could be used, by way of example, are MEK de-waxing and solvent de-oiling, wherein wax crystals settle out from an oil/solvent liquid phase.

The invention claimed is:

1. A scraper assembly for use in scraping the inner wall of a substantially cylindrical process vessel containing a liquid, comprising a scraper blade adapted to scrape the inner cylindrical wall of said vessel, a hollow shaft mounted axially of said vessel for supporting and rotating said blade about the vessel longitudinal axis, the interior of said shaft being sealed off from said liquid, thereby to entrap air in the hollow interior of such shaft; an elongated support member extending parallel to said shaft, means securing said support member to said shaft, and means coupling said blade to said support member, said support member being hollow and being sealed off from said liquid, thereby to entrap air in the hollow interior of such member.

2. Assembly of claim 1, wherein the means coupling the blade to the support member comprises a leaf spring mounted between the blade and the support member.

3. A scraper assembly for use in scraping the inner wall of a substantially cylindrical process vessel containing a liquid, comprising a pair of scraper blades adapted to scrape the inner cylindrical wall of said vessel, a hollow shaft mounted axially of said vessel for supporting and rotating said blades about the vessel longitudinal axis, the interior of said shaft being sealed off from said liquid, thereby to entrap air in the hollow interior of such shaft; a pair of elongated support members extending parallel to said shaft on respective opposite sides thereof, means securing each of said support members to said shaft, and means coupling each of said blades to a respective one of said support members, each of said support members being hollow and being sealed off from said liquid, thereby to entrap air in the hollow interior of each such member.

4. Assembly of claim 3, wherein the means coupling each blade to a respective support member comprises a leaf spring mounted between each blade and a respective support member.

* * * * *